(12) United States Patent
Painter

(10) Patent No.: US 8,555,944 B2
(45) Date of Patent: Oct. 15, 2013

(54) ANTI-FLEX ASSEMBLY

(75) Inventor: Brian Painter, Walsall (GB)

(73) Assignee: Davian Enterprises, LLC, Greenback, TN (US)

( * ) Notice: Subject to any disclaimer, the term of this patent is extended or adjusted under 35 U.S.C. 154(b) by 43 days.

(21) Appl. No.: 13/179,929

(22) Filed: Jul. 11, 2011

(65) Prior Publication Data

US 2012/0006495 A1 Jan. 12, 2012

Related U.S. Application Data

(60) Provisional application No. 61/363,004, filed on Jul. 9, 2010.

(51) Int. Cl.
*B29D 30/26* (2006.01)

(52) U.S. Cl.
USPC .......................................... 156/415; 156/417

(58) Field of Classification Search
USPC ................................ 156/414–420
See application file for complete search history.

(56) References Cited

U.S. PATENT DOCUMENTS

| | | |
|---|---|---|
| 2,168,897 A | 8/1939 | Bostwick |
| 2,201,469 A | 5/1940 | Bostwick |
| RE22,369 E | 8/1943 | Bostwick |
| 2,335,169 A | 11/1943 | Bostwick |
| 2,353,767 A | 7/1944 | Schnodarok |
| 2,367,831 A | 1/1945 | Manson |
| 2,614,057 A | 10/1952 | Ericson et al. |
| 2,699,198 A | 1/1955 | Balzhiser |
| 2,715,932 A | 8/1955 | Frazier |
| 3,346,434 A * | 10/1967 | Fulton ............................ 156/415 |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Leblono |
| 3,547,733 A | 12/1970 | Leblond |
| 3,598,673 A | 8/1971 | Caretta |
| 3,644,162 A | 2/1972 | Appleby et al. |
| 3,784,426 A | 1/1974 | Woodhall et al. |
| 3,787,262 A | 1/1974 | Appleby et al. |
| 3,816,218 A | 6/1974 | Felten |
| 3,867,229 A | 2/1975 | Marra |
| 3,873,398 A | 3/1975 | Yokoo et al. |
| 3,929,546 A | 12/1975 | Katagiri et al. |
| 3,948,717 A | 4/1976 | Suzuki et al. |
| 4,010,058 A | 3/1977 | Kubinski et al. |
| 4,126,507 A | 11/1978 | Kim et al. |
| 4,131,500 A | 12/1978 | Wilde et al. |
| 4,149,927 A | 4/1979 | Lauer, Jr. |
| 4,151,035 A | 4/1979 | Jellison |
| 4,155,796 A * | 5/1979 | Rambacher .................... 156/415 |
| 4,210,482 A * | 7/1980 | Collins .......................... 156/415 |

(Continued)

*Primary Examiner* — Geoffrey L Knable
(74) *Attorney, Agent, or Firm* — Pitts & Lake, P.C.

(57) ABSTRACT

The "Anti-Flex Assembly" is an assembly for maintaining axial stability in a rotatable, expandable and collapsible drum used in tire manufacturing. A cylindrical rod with at least one helical groove is defined in the outer surface of the cylindrical rod and at least one hardened dowel is aligned so as to protrude into the helical groove of the cylindrical rod. A means to maintain the orientation and protrusion of the hardened dowel protruding into the helical groove(s), and a clamping lock is provided to lock the cylindrical rod in place once the desired width of the rotatable, expandable and collapsible drum has been set, thus providing axial stability of the rotatable, expandable and collapsible drum during tire carcass manufacturing.

4 Claims, 5 Drawing Sheets

(56) References Cited

U.S. PATENT DOCUMENTS

| | | | |
|---|---|---|---|
| 4,220,494 | A | 9/1980 | Kawaida et al. |
| 4,239,579 | A | 12/1980 | Felten et al. |
| 4,292,112 | A | 9/1981 | Kumagai |
| 4,392,899 | A | 7/1983 | Bertoldo |
| 4,425,180 | A | 1/1984 | Samokhvalow et al. |
| 4,436,574 | A | 3/1984 | Long et al. |
| 4,445,962 | A | 5/1984 | Felder |
| 4,510,012 | A * | 4/1985 | Kawaida et al. .............. 156/415 |
| 4,521,269 | A | 6/1985 | Ozawa |
| 4,582,557 | A | 4/1986 | Enders |
| 4,636,277 | A | 1/1987 | Owen |
| 4,780,171 | A | 10/1988 | Byerley |
| 5,047,108 | A | 9/1991 | Byerley |
| 5,089,077 | A | 2/1992 | Byerley |
| 5,223,074 | A | 6/1993 | Miyanaga et al. |
| 5,225,028 | A | 7/1993 | Bierens |
| 5,354,405 | A | 10/1994 | Byerley |
| 5,505,803 | A | 4/1996 | Byerley |
| 5,618,374 | A | 4/1997 | Byerley |
| 5,755,922 | A | 5/1998 | Baldoni et al. |
| 6,013,147 | A | 1/2000 | Byerley |
| 6,390,166 | B1 | 5/2002 | Roberts et al. |
| 6,793,752 | B2 | 9/2004 | Lemaire et al. |
| 8,056,597 | B2 | 11/2011 | Byerley |

\* cited by examiner

ANTI-FLEX ASSEMBLY

CROSS-REFERENCE TO RELATED APPLICATIONS

This Application claims the benefit of U.S. Provisional Application 61/363,004, filed on Jul. 9, 2010.

STATEMENT REGARDING FEDERALLY SPONSORED RESEARCH OR DEVELOPMENT

Not Applicable.

BACKGROUND OF THE INVENTION

1. Field of Invention

This invention relates to tire building equipment. More particularly, this invention relates to an anti-flex assembly for axial stability in tire manufacturing equipment, specifically, tire manufacturing equipment which includes a rotatable, expandable and collapsible drum.

2. Description of the Related Art

Tire manufacturing processes, including the manufacture of motor vehicle tires, typically includes fabrication of a cylindrical carcass as a precursor product to the completed tire. A tire carcass is formed by laying down various components of the tire onto the outer circumference of a rotatable, expandable and collapsible drum. The drum must rotate to facilitate uniform tire carcass construction. The drum must expand to facilitate construction of the desired size tire carcass. The drum must contract to facilitate removal of the tire carcass from the drum.

Adjustability of the diameter of tire building drums commonly involves a plurality of segments which are moveable between radially collapsed positions and radially expanded positions in which the segments collectively define the outer circumference of the drum. U.S. Pat. No. 6,390,166 ("the '166 patent"), which patent is incorporated herein in its entirety by reference, discloses a tire building drum of this type. The device of the '166 patent includes generally a plurality of segments collectively defining the outer circumferential surface of a generally cylindrical drum. The segments are mounted by way of a system of linkages about a central main shaft which allows the segments to be selectively repositionable between expanded positions radially of the rotational axis of the drum and collapsed positions radially of the drum in which a portion of the segments are brought into overlying relationship with other of the segments to collapse the diameter of the drum. Positioning the segments in the expanded positions provides a relatively continuous circumferential outer surface of the drum, thereby permitting layup of various components of a tire carcass thereon for forming of the tire carcass. Positioning the segments in the collapsed positions collapses the diameter and circumference of the drum to permit the removal of a formed tire carcass from the drum.

Additionally, the plurality of segments are divided into two sets, one set being disposed on each of the opposite sides of a transverse centerplane of the drum, the centerplane being oriented normal to the rotational axis of the drum. The two sets of segments are mounted for selective positioning thereof axially of the drum from a location external of the drum to adjust the overall working width of the drum. The axial and radial movements of the divided sets of segments are accomplished by unique mechanisms which provide for both selective and coordinated movements of the segments from locations external of the drum. These mechanisms include a series of alignment rods which serve to provide axial stability to the two sets of segments as the width of the drum is adjusted. Unintended axial movement of the drum can cause nonuniform tire carcass development, thus a need in the art exists for innovative systems to increase axial stability of the drum manufacturing equipment.

BRIEF SUMMARY OF THE INVENTION

The present invention, an "Anti-Flex Assembly," is an assembly for maintaining axial stability in a rotatable, expandable and collapsible drum used in tire manufacturing. The invention comprises at least one cylindrical rod with at least one helical groove defined into the outer surface of the cylindrical rod, at least one lug to stabilize the cylindrical rod and facilitate even axial and rotational movement of the cylindrical rod, at least one hardened dowel aligned so as to protrude into the helical groove of the cylindrical rod, a means to maintain the orientation and protrusion of the hardened dowel protruding into the helical groove(s), and a clamping lock. The cylindrical rod is supported on both ends by means of lugs, known in the art. Each lug is permanently affixed to the interior surface of each large segment that forms a part of the radial surface of the drum. In some embodiments, each lug contains a bushing, also known in the art. The lug and bushing serve to stabilize the cylindrical rod and facilitate even axial and rotational movement of the cylindrical rod. A means, in some embodiments the means being a set screw, behind each hardened dowel assures precision tracking of the hardened dowel within the helical groove(s) of each cylindrical rod as the rotatable, expandable and collapsible drum is axially expanded or collapsed. The clamping lock serves to clamp the cylindrical rod into a stationary position once the desired width of the drum has been attained. Axial stability is greatly enhanced over the prior art, due to the combination of the dowel tracking along the helical groove, the lugs stabilizing the cylindrical rod, and the clamping lock maintaining the cylindrical rod in a stationary position once the desired drum width is achieved.

In some embodiments, the cylindrical rod portion of the anti-flex assembly features two symmetrical helical grooves. In some embodiments, these two symmetrical helical grooves "mirror" one another, each beginning towards the center of the cylindrical rod and terminating at respective ends of the cylindrical rod. In some embodiments, a hardened dowel protrudes into each helical groove and tracks the helical groove accordingly. In some embodiments, each hardened dowel is kept in position by a set screw, placed behind the hardened dowel, to assure steadfast protrusion of the hardened dowel into its respective helical groove, and consistent tracking of the hardened dowel within the helical groove as the cylindrical rod rotates to expand or compress the drum. In some embodiments, the clamping lock includes an adjustable screw to close the clamping lock around the cylindrical rod once the desired width of the drum has been achieved.

BRIEF DESCRIPTION OF THE DRAWINGS

The above-mentioned and additional features of the invention will become more clearly understood from the following detailed description of the invention read together with the drawings in which.

DETAILED DESCRIPTION OF THE INVENTION

Figure 1:
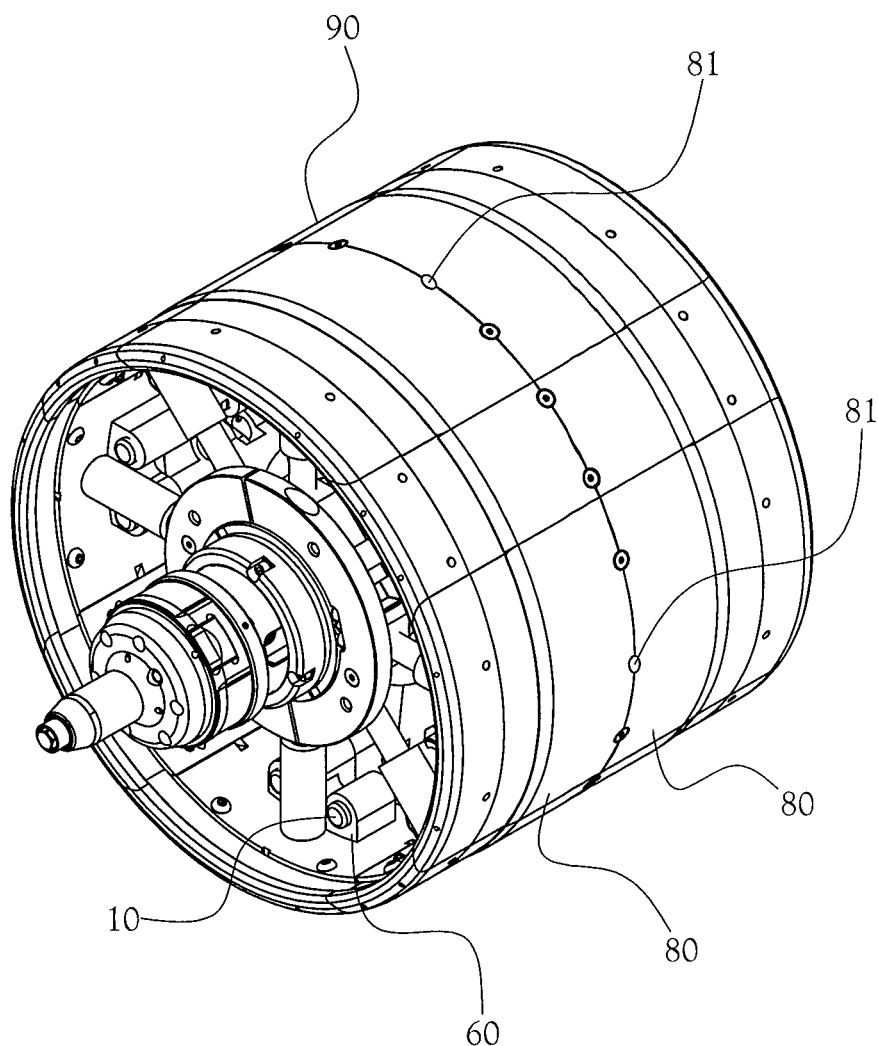
FIG. 1 is a perspective view of a tire manufacturing drum including and illustrating various features of the present invention.

The present invention, an "Anti-Flex Assembly," is an assembly for maintaining axial stability in a rotatable, expandable and collapsible drum used in tire manufacturing, such as the drum disclosed in the '166 patent. As shown in FIGS. 1-6, the invention is contained within the drum 90 and comprises at least one cylindrical rod 10, at least one lug 60, at least one helical groove 11 defined into the outer surface of the cylindrical rod 10, at least one hardened dowel 71 aligned so as to protrude into the helical groove 11 of the cylindrical rod 10, a means to maintain the orientation and protrusion of the hardened dowel 71 protruding into the helical groove(s) 11, and a clamping lock 23. The cylindrical rod 10 is held in position by at least one lug 60. Lug(s) 60 are fixedly attached to the inside of each segment 80 of the drum 90. In some embodiments, segments 80 may be variable in width, typically alternating between wide and narrow widths, as exemplified in the '166 patent. In some embodiments, lug(s) 60 may be fixedly attached to the interior of each segment 80 by welding. In some embodiments, lug(s) 60 are attached one to each segment 80 of drum 90, thus providing axial stability to each end of cylindrical rod 10 while allowing free rotation of cylindrical rod 10 within each lug 60. In some embodiments, each lug 60 may contain a bushing or bearing, known in the art, to decrease friction and enhance free rotation of cylindrical rod 10 within each lug 60. Lug(s) 60 define through openings in axial alignment for receiving cylindrical rod 10 therein. In some embodiments, lug 60 may be defined by at least one of various brackets as disclosed in the '166 patent. Cylindrical rod 10 is designed to facilitate entrance into and exit from the lug(s) 60 by means of the outer edge of cylindrical rod 10 being beveled 12 at each end 13 of the cylindrical rod 10. (See FIGS. 3 and 5).

Figure 2:
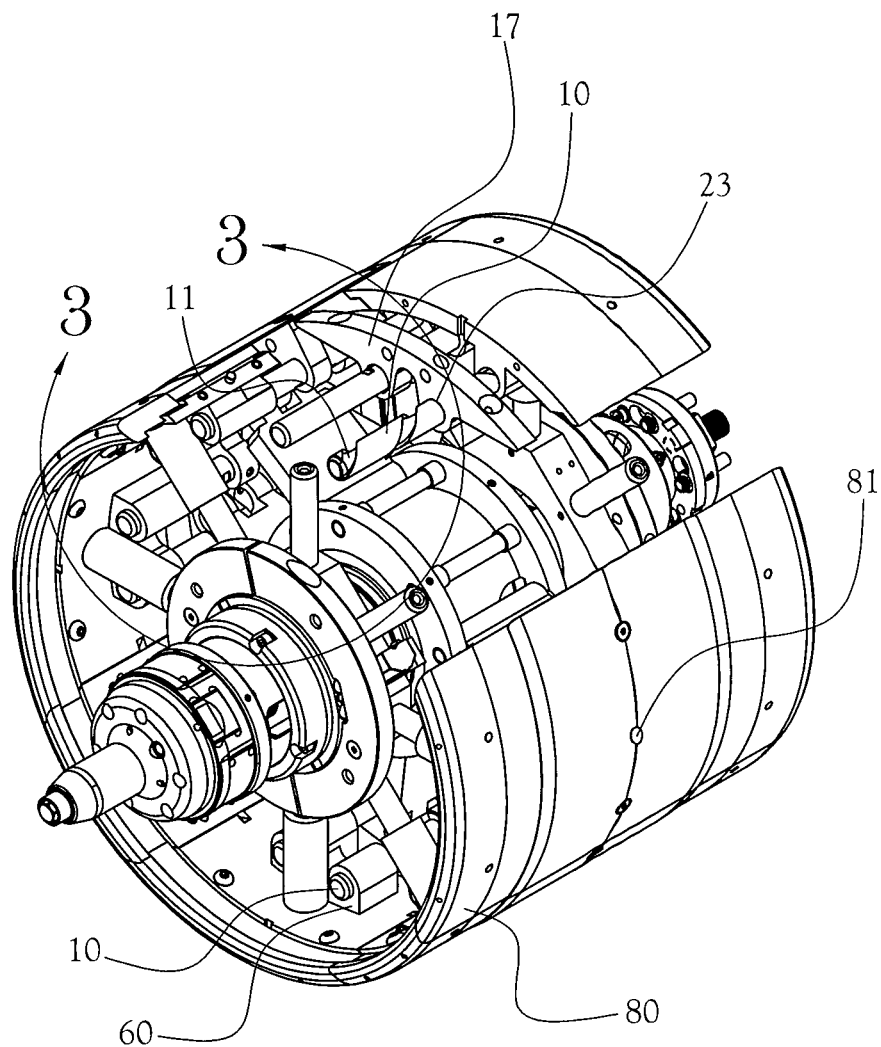
FIG. 2 is a partial perspective view of a tire manufacturing drum, showing a portion of the exterior wall segment of the drum cut away, including and illustrating various features of the present invention.

FIG. 2 illustrates a cutaway view of additional details in the drum, including a cylindrical rod 10 shown with lug 60 at the bottom portion of the drum and, for illustrative purposes only, a partially-exposed cylindrical rod 10 without lug 60 at the top portion of the drum. FIG. 2 illustrates how each cylindrical rod 10 also travels through a gap shield support 17, the gap shield support 17 being located approximately at the midsection of cylindrical rod 10, thus further enhancing the rotational stability of cylindrical rod 10 which further enhances the axial stability of segment(s) 80 and the overall drum 90. The gap shield support 17 defines a clamping lock 23 through which the cylindrical rod 10 is inserted. The clamping lock 23 serves to hold the cylindrical rod 10 in place once the desired width between segments 80 of drum 90 has been attained. In some embodiments, the clamping lock 23 holds the cylindrical rod 10 stationary by means of a socket head fastener 75 (see FIG. 4). Socket head fastener 75 is accessed by portal 23 (see FIG. 2). Once the desired width between segments 80 of drum 90 has been attained, the socket head fastener 75 is rotated so as to close the gap 76 defined in clamping lock 23. As the gap 76 of clamping lock 23 is closed, clamping lock 23 tightens around cylindrical rod 10. Closed lamping lock 23 prevents both axial and rotational movement of cylindrical rod 10 until such time as socket head fastener 75 is loosened and gap 76 in clamping lock 23 is reopened. Once socket head fastener 75 is loosened and gap 76 in clamping lock 23 is reopened, rotational movement of cylindrical rod 10 is allowed, thus the width of drum 90 may be expanded or collapsed as desired. FIG. 2 further shows cylindrical rod 10 with at least one helical groove 11 defined into the outer surface of the cylindrical rod 10.

Figure 3:
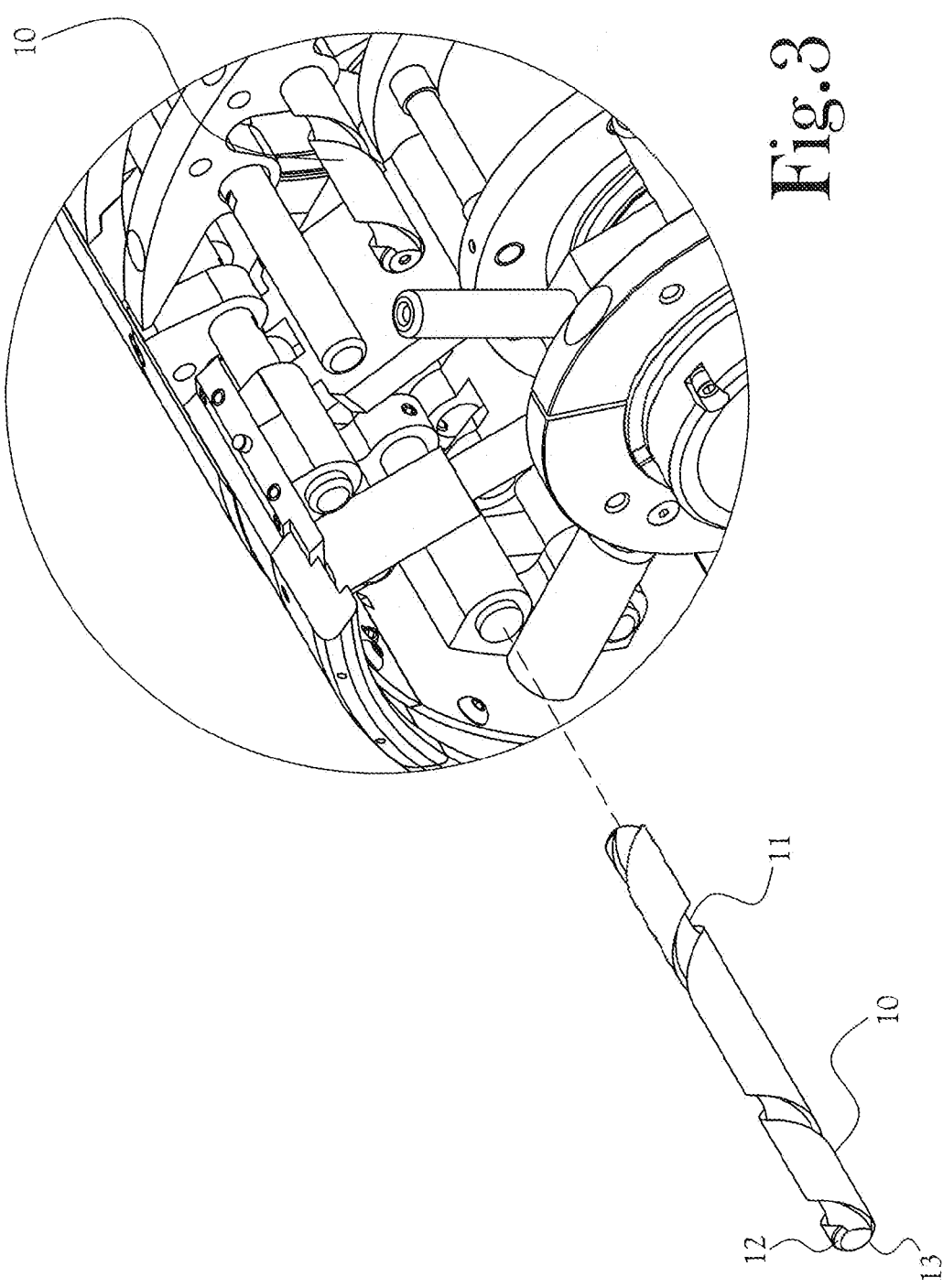
FIG. 3 is a close-up and partially exploded partial perspective view of a tire manufacturing drum including and illustrating various features of the present invention.

FIG. 3 shows the at least one helical groove 11 of cylindrical rod 10 more clearly. In some embodiments, at least two helical grooves 11 are utilized. In some embodiments, at least two helical grooves 11 are specifically oriented such that the at least two helical grooves 11 begin towards the center of the cylindrical rod 10 and terminate at respective ends 13 of the cylindrical rod 10. In some embodiments, at least two helical grooves 11 are specifically oriented such that the at least two helical grooves 11 "mirror" each other, beginning towards the center of the cylindrical rod 10 and terminating at respective ends 13 of the cylindrical rod 10. In some embodiments, cylindrical rod 10 is constructed so as to have a beveled edge 12 between the outer surface of cylindrical rod 10 and each end 13 of cylindrical rod 10, to facilitate insertion of cylindrical rod 10 into and through lug(s) 60 and gap shield support 17.

Figure 6:
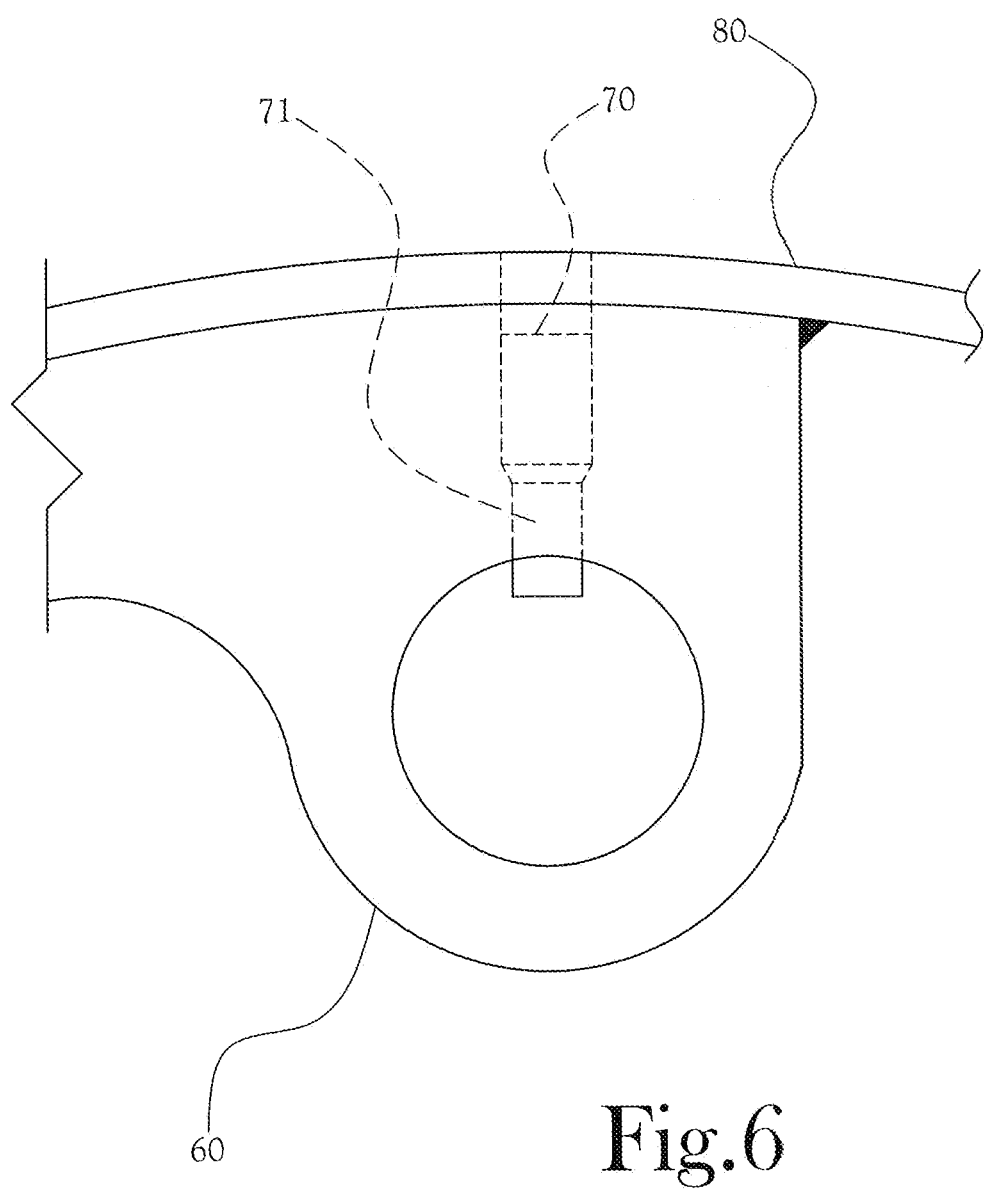
FIG. 6 is an end view of a lug feature of a tire manufacturing drum including and illustrating various features of the present invention.

Referring specifically to FIG. 6, lug 60, by which each respective beveled 12 end 13 of cylindrical rod 10 is axially stabilized while allowing free rotation of each respective beveled 12 end 13 of cylindrical rod 10, each lug 60 is constructed to allow insertion of a hardened dowel 71 through lug 60. In some embodiments, insertion of each hardened dowel 71 through each respective lug 60 is achieved by placing a close tolerance through opening within lug 60. In some embodiments, a threaded through opening is created within lug 60. Each hardened dowel 71 protrudes through a respective lug 60 and resides, in close tolerance, within the at least one helical groove 11 of cylindrical rod 10. The hardened dowel 71 is kept in position by a means located behind the hardened dowel 71. In some embodiments, each hardened dowel 71 is kept in place via a set screw 70 located behind hardened dowel 71 and within the same opening within its respective lug 60. As drum 90 rotates to widen or narrow the space between segments 80, each cylindrical rod 10 rotates. The rotation of cylindrical rod 10 provides means for path-specific travel of hardened dowel 71 within the helical path of each helical groove 11. The close tolerance travel of hardened dowel 71 within the helical path of each helical groove 11 maintains axial stability of each segment 80 of drum 90 while segments 80 move outward or inward as required to increase or decrease the overall width of drum 90.

Figure 4:
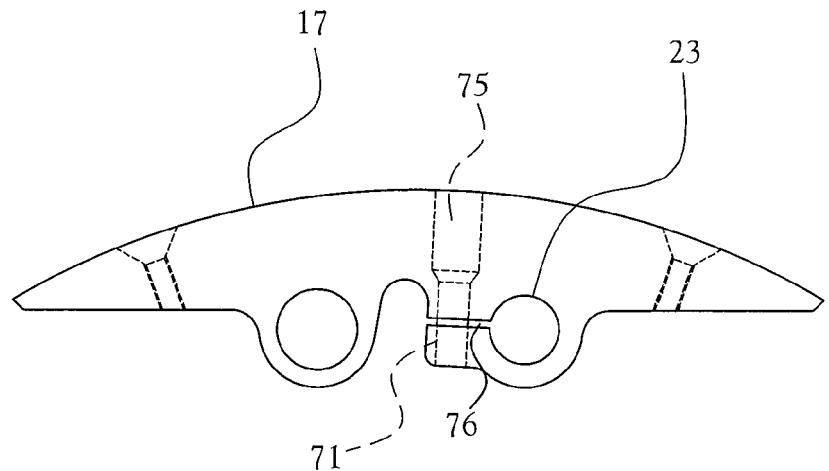
FIG. 4 is a side elevation view of a bracket feature of a tire manufacturing drum.

FIG. 4 is included to show gap shield support 17 and clamping lock 23 containing gap 76, as well as the location and orientation of socket head fastener 75. Once the desired width between segments 80 of drum 90 has been attained, the socket head fastener 75 is rotated so as to close the gap 76 defined in clamping lock 23. As the gap 76 of clamping lock 23 is closed, clamping lock 23 tightens around cylindrical rod 10. Closed lamping lock 23 prevents both axial and rotational movement of cylindrical rod 10 until such time as socket head fastener 75 is loosened and gap 76 in clamping lock 23 is reopened. Once socket head fastener 75 is loosened and gap 76 in clamping lock 23 is reopened, rotational movement of cylindrical rod 10 is allowed, thus the width of drum 90 may be expanded or collapsed as desired.

Figure 5:
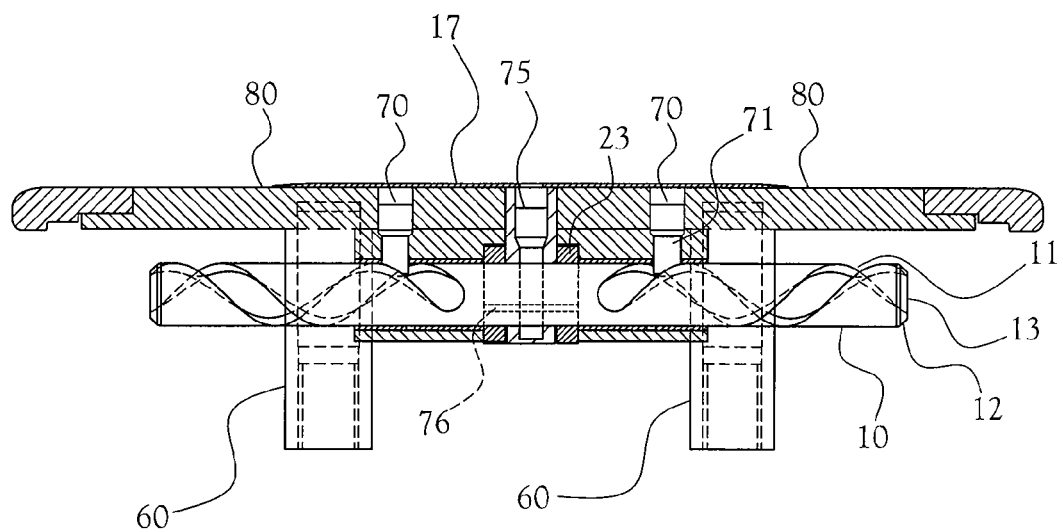
FIG. 5 is a cross-sectional view of a tire manufacturing drum including and illustrating various features of the present invention.

FIG. 5 shows a cross section of relevant parts of drum 90 in its most narrow configuration, with two segments 80 in close proximity to one another and gap shield support 17 centrally and closely overlying the two segments 80. As FIG. 5 illustrates, each end 13 of cylindrical rod 10 goes through and rests within lug 60. Cylindrical rod 10 also passes through clamping lock 23. Gap 76 of clamping lock 23 is illustrated in the open position. Socket head fastener 75 resides within clamping lock 23 and perpendicular to cylindrical rod 10. In some embodiments, socket head fastener 75 resides within gap 76 of clamping lock 23. As socket head fastener 75 is tightened, gap 76 closes, forcing clamping lock 23 to come into contact with cylindrical rod 10. Clamping lock 23, when gap 76 is in closed position, circumferentially encloses cylindrical rod 10, thus preventing axial or rotational movement of cylindrical rod 10. Maintaining cylindrical rod 10 in a stationary position disallows axial flexibility of segments 80, thus maintaining axial stability of the drum apparatus during tire carcass production. Upon loosening socket head fastener 75, thus opening gap 76 of clamping lock 23, cylindrical rod 10 is thereby enabled to rotate freely.

FIG. 5 further illustrates how hardened dowel 71 resides within, and travels along, helical groove 11 of cylindrical rod 10. A means, in some embodiments set screw 70, maintains hardened dowel 71 within the helical groove(s) 11 of each cylindrical rod 10. As segments 80 are pulled apart to widen drum 90, cylindrical rod 10 rotates, thus traveling hardened dowel 71 within the helical groove(s) 11 of cylindrical rod 10. This rotational travel provides axial stability between each set of opposing segments 80.

While the present invention has been illustrated by description of at least one embodiment, it is not the intention of the applicant to restrict or in any way limit the scope of the invention. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A rotatable, expandable and collapsible drum useful in the manufacture of vehicle tires and having a main shaft defining a rotational axis of the drum comprising:
   a plurality of segments, said segments being divided into first and second sets of segments, one set of segments being disposed on each of opposite sides of a transverse center plane of the drum,
   a central control mechanism controlling the radial positions of the segments in relation to the rotational axis of the drum while permitting axial movement of the two sets of segments relative to one another, whereby said segments are selectively positionable between expanded and collapsed positions radially of the drum,
   a plurality of lugs, each lug being fixedly attached to an inside surface of a corresponding segment, each lug of the first set of segments defining a through opening in axial alignment with a through opening defined by a lug of the second set of segments;
   a plurality of cylindrical rods, each cylindrical rod defining mirrored first and second helical grooves along an outer surface of the cylindrical rod, each cylindrical rod being received within a pair of axially-aligned through openings of the plurality of lugs;
   a plurality of gap shield supports, each gap shield support being located proximate a midsection of a corresponding cylindrical rod and defining a clamping lock through which the corresponding cylindrical rod is inserted, each clamping lock being configured to selectively lock the corresponding cylindrical rod against rotation in relation to the first and second sets of segments and to selectively unlock the corresponding cylindrical rod to allow rotation in relation to the first and second sets of segments; and
   a plurality of hardened dowels, each hardened dowel protruding through a corresponding lug and into a corresponding helical groove of a corresponding cylindrical rod;
   whereby rotation of each said cylindrical rod within corresponding through openings and clamping lock allows each hardened dowel to travel along a corresponding helical groove, thereby allowing axial movement of the two sets of segments relative to one another, and whereby locking of each said cylindrical rod prevents rotation within corresponding through openings and clamping lock, thereby preventing each hardened dowel from travelling along a corresponding helical groove and thereby preventing axial movement of the two sets of segments relative to one another.

2. The rotatable, expandable and collapsible drum of claim 1, said mirrored first and second helical grooves being further specifically oriented such that said mirrored first and second helical grooves begin towards the center of each said cylindrical rod and terminate at respective ends of said cylindrical rod.

3. The rotatable, expandable and collapsible drum of claim 2, said outer surface of each said cylindrical rod being further constructed so as to form a beveled edge at each terminal end of said outer surface of said cylindrical rod.

4. The rotatable, expandable and collapsible drum of claim 1 further including at least one set screw for maintaining the orientation and protrusion of each said hardened dowel.

* * * * *